3,364,539
BRAKING ARRANGEMENT FOR A WARP BEAM
Flavio Golfetto, Belmont-de-la-Loire, France
Filed Oct. 4, 1965, Ser. No. 492,488
Claims priority, application France, Oct. 6, 1964,
45,189
5 Claims. (Cl. 28—32)

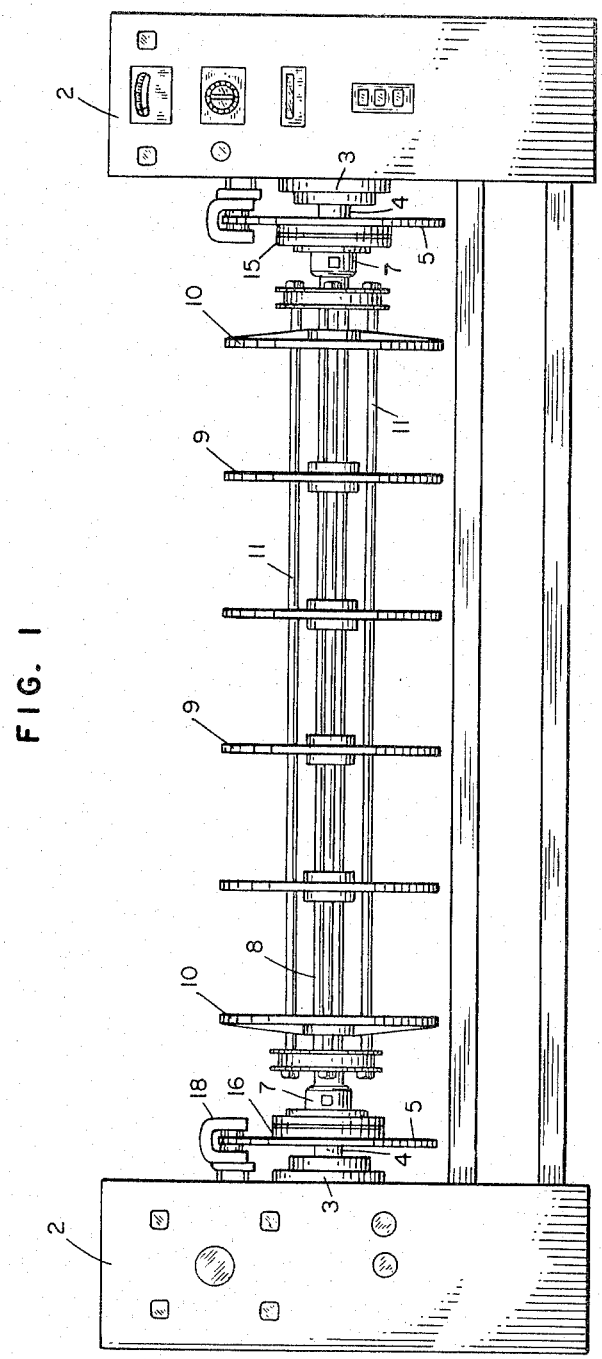

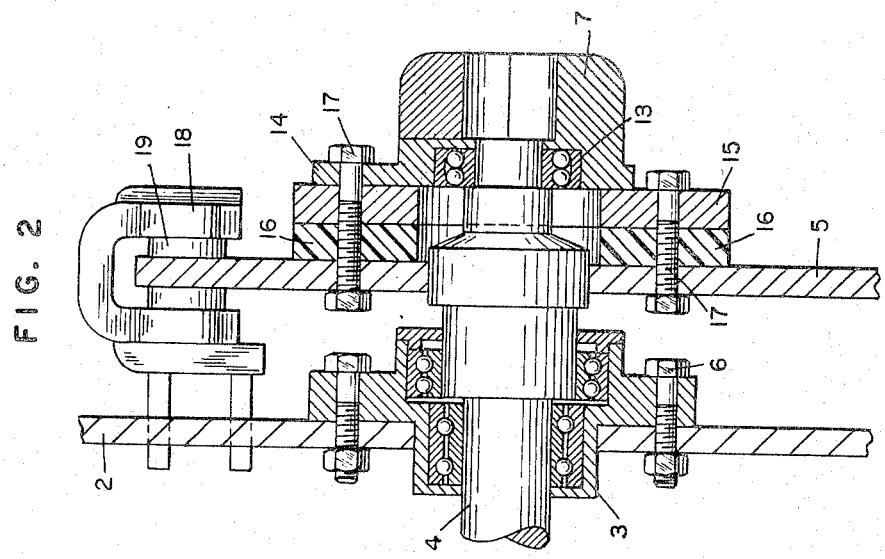
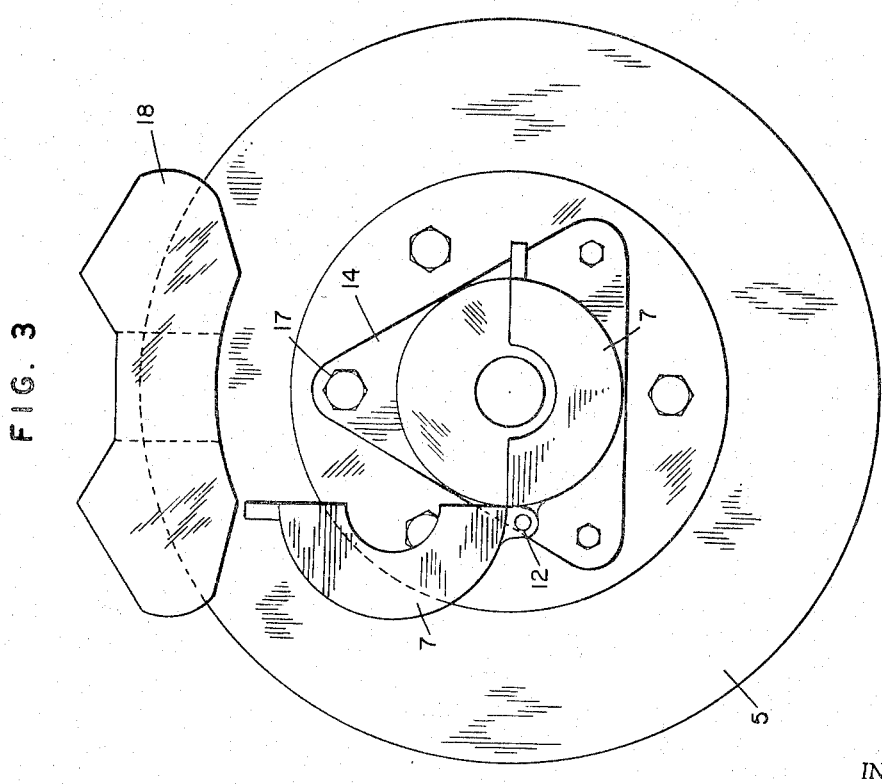
INVENTOR
FLAVIO GOLFETTO

United States Patent Office 3,364,539
Patented Jan. 23, 1968

ABSTRACT OF THE DISCLOSURE

A braking arrangement for braking a warp beam in a fast substantially shock-free manner and including support means having a pair of spaced portions facing each other, a pair of spaced shaft portions respectively mounted on the spaced portions of the support means turnably about a common axis, a pair of brake disks coaxially fixed to the shaft portions, a pair of braking means cooperating with the disks and mounted on the portions of the support means, and a warp beam carried on the free ends of the shaft portions for rotation therewith.

---

The present invention relates to a braking arrangement for a warp beam, and especially to a braking arrangement which permits braking of rotation of a warp beam in a fast but substantially shock-free manner when such braking becomes necessary during the warping operation.

Various braking arrangements for this purpose are known in the art and the known braking arrangements usually comprise internal brakes or band brakes respectively cooperating with end portions of a pair of drive shafts located spaced from each other and aligned along a common axis with a warp beam extending between the free ends of the shaft portions and fixedly connected thereto for rotation therewith. Such known braking arrangements have, however, not worked to full satisfaction since they provide too abrupt braking action and especially since these braking arrangements heat up considerably and lose their efficiency after extended use.

It is an object of the present invention to overcome these disadvantages of braking arrangements of the aforementioned kind.

It is an additional object of the present invention to provide for a braking arrangement for a warp beam which permits a rapid and substantially shock free braking of rotation of the warp beam.

It is a further object of the present invention to provide for a braking arrangement of the aforementioned kind which is composed of relatively few and simple parts so that the braking arrangement may be manufactured at reasonable cost and will stand up perfectly after extended use.

With these objects in view, the braking arrangement according to the present invention mainly comprises support means having a pair of portions spaced from and facing each other, a pair of spaced shaft portions aligned along a common axis with each other and having free ends facing each other, which shaft portions are respectively mounted in the aforementioned pair of portions of the support means rotatable about said common axis and at least one of the shaft portions is driven. A pair of brake disks are respectively fixedly mounted on said pair of shaft portions for rotation therewith and a pair of braking means respectively cooperate with the pair of brake disks for braking and releasing the same. The pair of brake means are respectively mounted on the pair of portions of support means, and a warp beam is carried on the free ends of the aforementioned shaft portions for rotation therewith.

Preferably, a pair of flexible coupling means are provided for connecting opposite ends of the warp beam respectively to the free ends of the shaft portions for limited movement relative thereto. The coupling means may comprise a pair of clamping sleeves respectively fixed to the aforementioned opposite ends of the warp beam, a pair of anti-friction bearings respectively mounting the clamping sleeves on the free ends of the shaft portions for rotation relative thereto and yieldable means operatively connected to the clamping sleeves and the free ends of the shaft portions and elastically resisting rotation of the clamping sleeves relative to the free ends of the shaft portions. The yieldable means may comprise an annular member of elastically yieldable material sandwiched between each brake disk and a base of the respective clamping sleeve adjacent thereto and connected on the one hand to the respective brake disk and on the other hand to the respective base.

Such an arrangement will not only reduce shocks during the braking action, but such an arrangement will also permit a slight adjustment of the warp beam relative to the shaft portions carrying the same.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is an over-all side view of the braking arrangement according to the present invention;

FIG. 2 is a partial sectional view taken along the axis of the arrangement and drawn to an enlarged scale; and FIG. 3 is an end view of FIG. 2 as viewed from the right side of the latter.

Referring now to the drawings, and more specifically to FIG. 1 of the same, it will be seen that the braking arrangement according to the present invention mainly comprises support means having a pair of frame portions 2 arranged spaced from and facing each other and respectively carrying on wall portions facing each other a housing 3 fixed to the respective wall portion by bolts 6 and each supporting in the interior thereof a pair of roller bearings, as best shown in FIG. 2. The roller bearings in each of the housings 3 respectively support a drive shaft 4 extending with the free ends thereof beyond the respective housing 3. The drive shafts 4 respectively mounted on the right and left support frame portions 2, as shown in FIG. 1, are aligned along a common axis and driven by drive means located in the frame portions 2 at synchronous speeds. The drive means and controls therefore are of standard construction and do not form part of the present invention and are therefore not shown in the drawings. A brake disk 5 is fixedly connected, for instance by welding, to each of the drive shafts 4 adjacent the free end thereof. Cooperating with each of the brake disks 5 are brake means of known construction which may comprise a U-shaped member 18 fixedly carried on the respective wall portion of the respective frame member 2, as best shown in FIG. 2, and a pair of brake shoes 19 carried by the U-shaped member 18 respectively on opposite sides of each brake disk 5, movable between a braking position tightly engaging the opposite faces of the brake disk 5 and a releasing position slightly removed from these opposite faces.

Movement of the brake shoes 19 between the braking and the releasing positions thereof may be carried out by means well known in the art, for instance by hydraulic means operated by pumps actuated by electromagnets or by any other means known in the art and the means for moving the brake shoes between the braking and the releasing positions thereof are therefore not illustrated in the drawings.

A warp beam extends between the free ends of the drive shaft 4 carried thereby in a manner as will be described below. The warp beam may be of any known construction and it may for instance comprise, as shown in FIG. 1, a central shaft 8 carrying adjacent opposite ends thereof a pair of plates 10, and intermediate these plates 10 a plurality of spaced disks 9, while a plurality of elongated rods 11 extending parallel to the central shaft 8 are carried uniformly distributed about the shaft 8 by the plates 10 and disks 9. The specific construction of the warp beam does not form part of the present invention and any standard construction of warp beams may be used in connection with the arrangement of the present invention.

The opposite ends of the central shaft 8 of the warp beam are clamped in clamping sleeves 7 and each of the clamping sleeves preferably comprises two parts hinged together at 12 as shown in FIG. 3, so that the upper part of each clamping sleeve may be moved between an open position, as shown in FIG. 3, and a closed position, as shown in FIG. 2, in which the clamping sleeve tightly clamps the respective end of the central shaft 8 of the warp beam. Appropriate fastening means, not shown in the drawing, are provided for holding the two parts of each clamping sleeve in closed poistion and such clamping means may for instance comprise one or a plurality of screws extending through the projections projecting to the right side of each clamping sleeve half, as shown in FIG. 3.

Each of the clamping sleeves 7 has a base 14 which abuts against an annular plate 15, while an additional annular plate 16 of elastic material, for instance rubber, is sandwiched between the annular plate 15 and the respective brake disk 5. A plurality of screws 17, for instance three as shown in FIG. 3, extend through aligned bores in the disks 15, 16 and 5 to hold the disks 15 and 16 on the respective brake disk 5. The base 14 of each clamping sleeve 7 is preferably of triangular configuration, as shown in FIG. 3, and this base is connected by screws 17' extending through aligned bores in the base 14 and the disks 15, 16 and 5 to the respective brake disk 5. The screws 17' are staggered relative to the screws 17 and the screws 17' extend with ample clearance through the respective disk 15 and brake disk 5, so that each clamping sleeve 7 may move slightly relative to the respective brake disk under the action of excessive forces, whereby during such movement resilient stresses will be created in the annular rubber disk 16 tending to restore the relative position of each clamping sleeve 7 to the respective brake disk 5. Each clamping sleeve is centered on the free end of reduced diameter of the respective drive shaft 4 by a ball bearing 13 and therefore each clamping sleeve 7 may only perform slight angular movements about the axis of the respective drive shaft 4 while being centered relative to the axis thereof.

The braking arrangement above described has the following advantages:

The disk brakes used in the present arrangement are perfectly cooled and will therefore operate efficiently over a long period. Furthermore, the annular disks 16 of elastic material will absorb shocks occurring during the braking operation so that braking of the warp beam may be carried out very fast without producing any shocks in the warp beam itself. The ball bearings 13 will facilitate slight angular movement of the clamping sleeves 7 relative to the drive shafts 4 while maintaining the clamping sleeves properly centered with respect to the drive shafts.

It will be understood that each of the elements described above, or two or more together, may also find a useful application in other types of braking arrangements for warp beams differing from the types described above.

While the invention has been illustrated and described as embodied in a braking arrangement for a warp beam reducing shocks to the warp beam during rapid braking operation, it is not intended to be limited to the details shown, since various modifications and structural changes may be made without departing in any way from the spirit of the present invention.

I claim:
1. A braking arrangement for a warp beam comprising, in combination, support means having a pair of portions spaced from and facing each other; a pair of spaced shaft portions aligned along a common axis with each other and having free ends facing each other, said shaft portions being respectively mounted in said pair of portions of said support means rotatable about said common axis, at least one of said shaft portions being driven; a pair of brake discs respectively fixedly mounted on said pair of shaft portions for rotations therewith; a pair of braking means respectively cooperating with said pair of brake discs and each being movable between a braking and a releasing position, said pair of brake means being respectively mounted on said pair of portions of said support means; and a warp beam carried on said free ends of said shaft portions for rotations therewith.

2. A braking arrangement for a warp beam comprising, in combination, support means having a pair of portions spaced from and facing each other; a pair of spaced shaft portions aligned along a common axis with each other and having free ends facing each other, said shaft portions being respectively mounted in said pair of portions of said support means rotatable about said common axis, at least one of said shaft portions being driven; a pair of brake discs respectively fixedly mounted on said pair of shaft portions for rotations therewith; a pair of braking means respectively cooperating with said pair of brake discs and each being movable between a braking and a releasing position, said pair of brake means being respectively mounted on said pair of portions of said support means; a warp beam extending between said free ends of said shaft portions substantially aligned therewith along said axis; and flexible coupling means for connecting opposite ends of said warp beam respectively to said free ends of said shaft portions for limited movement relative thereto.

3. A braking arrangement as set forth in claim 2, wherein said coupling means comprises a pair of clamping sleeves respectively fixed to said opposite ends of said warp beam, a pair of anti-friction bearings respectively mounting said clamping sleeves on said free ends of said shaft portions for rotation relative thereto, and means limiting rotation of said clamping sleeves relative to said free ends of said shaft portions.

4. A braking arrangement as set forth in claim 2, wherein said coupling means comprises a pair of clamping sleeves respectively fixed to said opposite ends of said warp beam, a pair of anti-friction bearings respectively mounting said clamping sleeves on said free ends of said shaft portions for rotation relative thereto, and yieldable means operatively connected to said clamping sleeves and said free ends of said shaft portions and elastically resisting rotation of said clamping sleeves relative to said free ends of said shaft portions.

5. A braking arrangement as set forth in claim 4, wherein each of said clamping sleeves has a base, and wherein said yieldable means comprise an annular member of elastically yieldable material sandwiched between each brake disc and the base of the respective clamping sleeve adjacent thereto and connected on the one hand to the respective brake disc and on the other hand to the respective base.

References Cited
UNITED STATES PATENTS

| | | | |
|---|---|---|---|
| 2,079,316 | 5/1937 | Garrett | 28—32 |
| 2,546,141 | 3/1951 | Bauer | 28—35 X |
| 2,645,838 | 7/1953 | Lambach | 28—32 |
| 2,843,915 | 7/1958 | Drake | 28—32 |

LOUIS K. RIMRODT, *Primary Examiner.*